United States Patent [19]

Salam et al.

[11] Patent Number: 5,689,621
[45] Date of Patent: Nov. 18, 1997

[54] MODULAR FEEDFORWARD NEURAL NETWORK ARCHITECTURE WITH LEARNING

[75] Inventors: Fathi M. A. Salam, Okemos; Hwa-Joon Oh, East Lansing, both of Mich.

[73] Assignee: Michigan State University, East Lansing, Mich.

[21] Appl. No.: 430,542

[22] Filed: Apr. 28, 1995

[51] Int. Cl.$^6$ .................................... G06F 15/18
[52] U.S. Cl. ............................... 395/24; 395/23
[58] Field of Search ................... 395/23, 24, 27, 395/25

[56] References Cited

U.S. PATENT DOCUMENTS

| | | | |
|---|---|---|---|
| 5,055,897 | 10/1991 | Canepa et al. | 357/23.5 |
| 5,148,514 | 9/1992 | Arima et al. | 395/24 |
| 5,214,743 | 5/1993 | Asai et al. | 395/24 |
| 5,222,193 | 6/1993 | Brooks et al. | 395/23 |
| 5,241,509 | 8/1993 | Jousselin et al. | 395/27 |
| 5,274,748 | 12/1993 | Boser et al. | 395/27 |
| 5,276,773 | 1/1994 | Knauer et al. | 395/27 |
| 5,293,457 | 3/1994 | Arima et al. | 395/24 |
| 5,293,458 | 3/1994 | Chung et al. | 395/27 |
| 5,298,796 | 3/1994 | Tawel | 395/201 |
| 5,317,675 | 5/1994 | Ikehara | 395/23 |
| 5,319,738 | 6/1994 | Shima et al. | 395/24 |
| 5,333,241 | 7/1994 | Furuta et al. | 295/27 |
| 5,353,382 | 10/1994 | Yariv et al. | 395/24 |

OTHER PUBLICATIONS

36th Midwest Symposium On Circuit & Systems Proceedings, Aug. 16–18, 1993, Detroit,MI, "A Modular Analog Chip For Feedforward Networks With On–Chip Learning" Oh & Salam.

Proceedings Of 22nd Symposium On The Interface, May 16–19, 1990, "Learning Algorithms For Artificial Neural Nets For Analog Circuit Implementation", Fathi M.A. Salam.

"Analog CMOS Implementation Of Neural Network For Adaptive Signal Processing", Oh & Salam, May/Jun. 1994.

S. Garth, "A Chipset for High Speed Simulation of Neural Network Systems," 1987 IEEE Conf. on Neural Networks, pp. III-443 to III-452, Dec. 1987.

E. Fiesler et al., "A Weight Discretization Paragigm for Optical Neural Networks," SPIE vol. 1281 Optical Interconnections and Networks, pp. 164–173, Mar. 1990.

*Primary Examiner*—Robert W. Downs
*Attorney, Agent, or Firm*—Brooks & Kushman

[57] ABSTRACT

A first feedforward network receives an input vector signal and a plurality of weight signals and forms an output vector signal based thereupon. A second feedforward network, substantially identical to the first feedforward network, receives a first learning vector signal and the weight signals and forms a learning output vector based thereupon. A weight updating circuit generates the weight signals in accordance with a back propagation updating rule. The weight signals are updated based upon the first learning vector signal and a second learning vector signal in response to receiving a first predetermined layer signal, and are updated based upon the first learning vector signal, the second learning vector signal, and the learning output vector signal in response to receiving a second predetermined layer signal. A back propagation feedback network receives the second learning vector signal and the weight signals and generates a back propagated error vector signal based thereupon. The feedforward networks, the weight updating circuit, and the back propagation feedback network are implemented as analog circuits on a single integrated circuit.

11 Claims, 7 Drawing Sheets

MODULAR FEEDFORWARD NEURAL NETWORK ARCHITECTURE WITH LEARNING

TECHNICAL FIELD

The present invention relates to artificial neural networks with learning implemented on an integrated circuit.

BACKGROUND ART

An adaptive system is self-adjusting such that its behavior, gauged in terms of a predetermined performance measure, improves through contact with its environment. A principal property of an adaptive system is its ability to self-adjust over time in order to improve its behavior. Adaptive systems are well-suited for application in fields such as communications, control, radar, seismology, navigation systems, and biomedical electronics.

Feedforward neural networks may be considered as a type of adaptive systems wherein an output signal vector is produced based upon an input vector signal and a plurality of weights. In the standard form, each component of the output signal vector is produced by a corresponding linear combination block which forms a dot product of the input vector signal and a weight vector. To optimize the performance, the weight vectors are adjusted to minimize an error signal, which is typically based upon a difference between the output vector signal and a desired vector signal. This process is known in the art as "learning" or "training" of the neural network.

Many prevalent methods for neural network learning are implemented entirely in software on a computer. Other methods for neural network learning utilize an integrated circuit architecture to which weight values are supplied from a host computer executing a software-based learning algorithm. The large number of weight values which must be provided to the integrated circuit makes interfacing difficult for these methods. Further, current neural network integrated circuits require refresh circuitry for holding the analog weights for use by a processing circuit contained therein.

SUMMARY OF THE INVENTION

It is an object of the present invention to provide an improved interface architecture for a neural network integrated circuit.

Another object of the present invention is to provide an architecture for feedforward neural networks in microelectronic hardware which performs fast on-chip learning.

A further object of the present invention is to provide a modular architecture for a feedforward neural networks integrated circuit chip whereby several chips can be cascaded and tiled to construct large-scale neural networks.

In carrying out the above objects, the present invention provides an integrated circuit neural network having an internal learning circuit which generates a plurality of weight signals for an internal processing circuit. The processing circuit includes a first feedforward network which receives an input vector signal and a plurality of weight signals and forms an output vector signal based thereupon. The learning circuit includes a second feedforward network, substantially identical to the first feedforward network, which receives a first learning vector signal and the weight signals and forms a learning output vector based thereupon.

In a preferred embodiment, a weight updating circuit which generates the weight signals in accordance with an updating rule, is further included in the learning circuit. The weight signals are updated based upon the first learning vector signal and a second learning vector signal in response to receiving a first predetermined layer signal, and are updated based upon the first learning vector signal, the second learning vector signal, and the learning output vector signal in response to receiving a second predetermined layer signal. A back propagation feedback network in the learning circuit receives the second learning vector signal and the weight signals and generates a back propagated error vector signal based thereupon.

These and other features, aspects, and embodiments of the present invention will become better understood with regard to the following description, appended claims, and accompanying drawings.

BEST MODE FOR CARRYING OUT THE INVENTION

Figure 1:
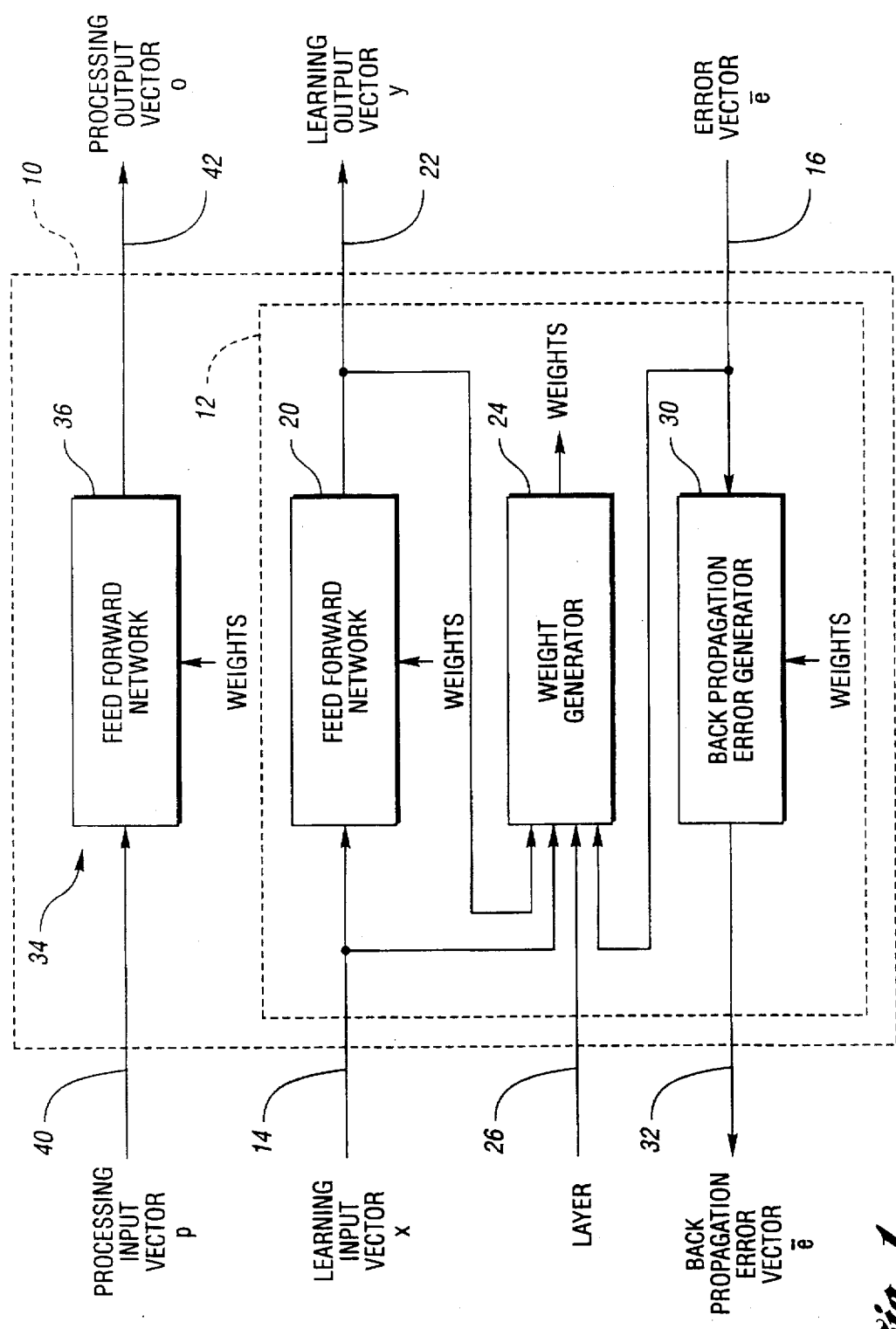
FIG. 1 is a block diagram of an embodiment of a neural network integrated circuit in accordance with the present invention.

Referring to FIG. 1, there is shown a block diagram of an embodiment of a neural network integrated circuit 10 in accordance with the present invention. The neural network integrated circuit 10 includes a learning circuit 12 which receives a first learning input vector signal along external pins 14, and receives a second learning input vector signal along external pins 16. The learning circuit 12 generates a plurality of weight signals based upon the first and the second learning input vector signals. In particular, the weight signals are updated, based upon the first and the second learning input vector signals, to improve a predetermined error measure.

The learning circuit 12 includes a feedforward network 20 which receives the weight signals and the first learning input vector signal, and produces a learning output vector signal based thereupon. The learning output vector signal is transmitted along external pins 22 for access thereof exterior to the integrated circuit 10.

The learning circuit 12 further includes a weight updating circuit 24 which updates the weight signals based upon the first learning input vector signal and the second learning input vector signal. The learning input vector signals typically comprise an input-target training pair which are applied to the integrated circuit 10 for training the network. By periodically applying the complete set of input-target training pairs along external pins 14 and 16, the weight signals are successively updated to converge to a set of averaged equilibrium values. In a preferred embodiment, the weight signals are updated in accordance with a form of back propagation updating rule.

Also in a preferred embodiment, the weight updating circuit 24 further receives a layer indication signal along an external pin 26. The layer indication signal indicates whether the weights are to be updated in accordance with a hidden layer updating rule or in accordance with an output layer updating rule. In particular, the weight signals are updated based upon the first learning vector signal and a second learning vector signal in response to receiving a layer signal indicating the hidden layer updating rule. Alternatively, the weight signals are updated based upon the first learning vector signal, the second learning vector signal, and the learning output vector signal in response to receiving a layer signal indicating the output layer updating rule.

The learning circuit 12 further includes a back propagation feedback network 30 which generates a back propagated error vector signal based upon the second learning vector input signal and the weight signals. The back propagated error vector signal is transmitted along external pins 32 for access thereof exterior to the integrated circuit 10. In practice, the back propagated error vector signal is utilized by a like neural network integrated circuit employed in a previous layer in a multi-layer network.

The weight signals are applied to a processing circuit 34 within the neural network integrated circuit 10. The processing circuit 34 includes a feedforward network 36, substantially identical to the feedforward network 20, which receives the weight signals, and receives an input vector signal along external pins 40. The feedforward network 36 forms an output vector signal, based upon the input vector signal and the weight signals, for transmission along external pins 42.

By including the learning circuit 12 and the processing circuit 34 (which share the same weight values) within the same integrated circuit, there is no need for an external interface circuit for weight refreshing. In particular, the learning circuit 12 continuously processes a set of training patterns in order to both achieve learning and perform indirect refreshing of the weight values applied to the processing circuit 34. As long as the learning circuit 12 is in operation, the processing circuit 34 receives the weight values to which the learning circuit 12 has converged. The learning circuit 12 and the processing circuit 34 are otherwise decoupled, and hence, do not disturb one another. By not requiring an external interface circuit, the number of external pins on the integrated circuit 10 are reduced.

In order to describe a specific back propagation updating rule well-suited for use in embodiments of the present invention, the following variables are introduced to denote quantities represented by the above-described signals. The first learning input vector signal, which is representative of n inputs, is denoted by $x_i$, where i=1, 2, ..., n. The second learning input vector signal, which is representative of m inputs, is denoted by $e_j$, where j=1, 2, ..., m. The learning output vector signal, which is representative of m outputs, is denoted by $y_j$, where j=1, 2, ..., m. The input vector signal used for processing, which is representative of n inputs, is denoted by $P_i$, where i=1, 2, ..., n. The processed output vector signal, which is representative of m outputs, is denoted by $o_j$, where j=1, 2, ..., m. The weight signals are representative of m×n connection weights and are denoted by $w_{ji}$, where j=1, 2, ..., m and i=1, 2, ..., n, and m threshold values denoted by $\theta_j$, j=1, 2, ..., m. The variables m and n are integers which are greater than or equal to unity.

The feedforward network 20 produces the learning output vector signal in accordance with the equation:

$$y_j = S\left( \sum_i g(w_{ji}, x_i) \right) \quad (1)$$

where $g(.,.)$ denotes a general synapse function, and $S(.)$ is a differentiable and monotonically increasing sigmoid function. Similarly, the feedforward network 36 produces the output vector signal in accordance with the following equation:

$$o_j = S\left( \sum_i g(w_{ji}, P_i) \right) \quad (2)$$

The weight updating circuit 24 updates the weight signals based upon any algorithm for back propagating signals that include the standard back propagation learning algorithm. In particular, a learning algorithm which is continuous-time and eliminates the use of the derivative of the sigmoidal function $S(.)$ is employed. This choice reduces the realization into hardware considerably and results into more efficient implementations. This continuous-time learning algorithm is described in the following equation:

$$\dot{w}_{ji} = \eta' \sum_p \delta_{p_j} \cdot x_{p_i} - \alpha_{ji} w_{ji} \quad (3)$$

where $\eta'$ is a learning constant, p is an index identifying different training patterns, $\alpha_{ji}$ is an adaptive quantity, and $\delta_{p_j}$ is an updating quantity. For a hidden layer, the updating quantity $\delta_{p_j}$ is given by:

$$\delta_{p_j} = \sum_k \delta_{p_k} w_{kj} \quad (4)$$

For an output layer, the updating quantity is:

$$\delta_{p_j} = t_{p_j} - y_{p_j} \quad (5)$$

where $t_{p_j}$ denotes the target output for the pth training pattern.

In order to produce a modular integrated circuit, a variable $z_p$ is introduced to rewrite equation (3) as:

$$\dot{w}_{ji} = \eta' \sum_p (\bar{e}_p - z_p) x_{p_i} - \alpha_{ji} w_{ji} \quad (6)$$

where, for an output layer:

$$\bar{e}_p = t_{p_j}, z_p = y_{p_j} \quad (7)$$

and for a hidden layer:

$$\bar{e}_p = \sum_k \delta_{p_k} w_{kj} = \sum_k (t_{p_k} - y_{p_k}) w_{kj} \quad (8)$$

$$z_p = 0.$$

Thus, the selection of the variable $z_p$ indicates whether the module is within the output layer or within a hidden layer. This selection is performed by the layer signal in this architecture. The equations for $\bar{e}_p$ represent the back propagation error.

Although the update rules have been written as sums over all training patterns p, a consecutive learning approach may be employed wherein each pattern pair is applied consecutively. Here, the network receives p input-target pairs as a periodic, continuous-time (or piecewise continuous) waveform. For a suitable range of frequencies of the constructed periodic waveform, the network successively achieves convergence of the weights to substantially constant values. Another technique is to supply the p input-target pairs randomly if p is large.

Figure 2:
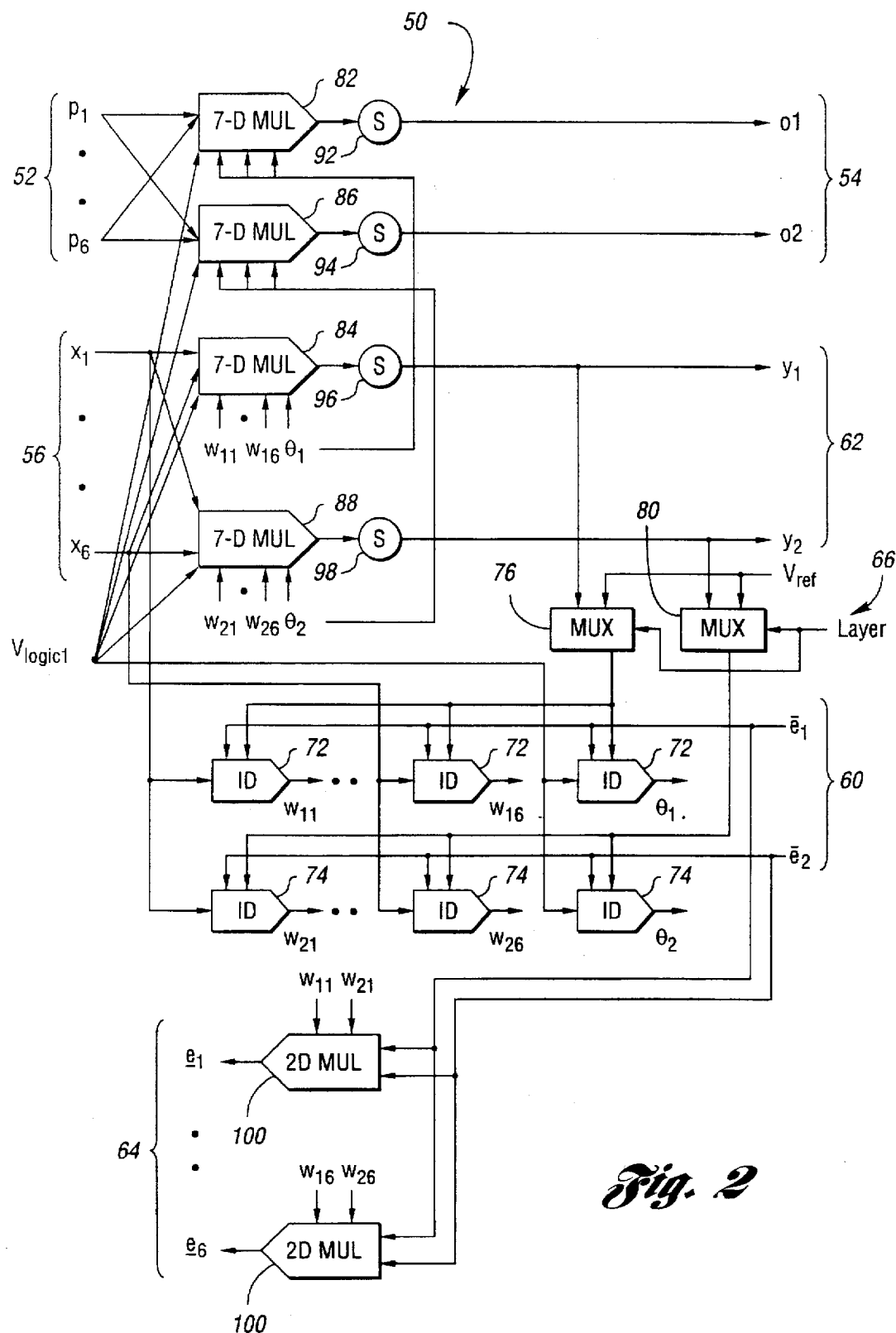
FIG. 2 is a schematic, block diagram of an embodiment of a 6×2 neural network integrated circuit.

Turning now to FIG. 2, there is shown a schematic block diagram of an embodiment of a 6×2 neural network integrated circuit 50. The integrated circuit 50 includes six input neurons, two output neurons, two threshold units, and thus has 14 weights for adjusting the network. One having ordinary skill in the art will appreciate that the 6×2 embodiment described herein is presented as an example, and may be modified to provide a network with any number of input neurons and output neurons.

The integrated circuit 50 has six external pins 52 for receiving an analog signal representation of a six-component input vector, two external pins 54 for transmitting an analog signal representation of a two-component output vector, six external pins 56 for receiving an analog signal representation of a six-component learning vector, two external pins 60 for receiving an analog signal representation of a two-component learning vector, two external pins 62 for transmitting an analog signal representation of a two-component learning output vector, six external pins 64 for transmitting an analog signal representation of a six-component back propagated error vector, and an external pin 66 for receiving a layer indication signal.

Each of the six external pins 56 is coupled to a corresponding one of seven one-dimensional multipliers 72, and to a corresponding one of seven one-dimensional multipliers 74. An internal voltage line is coupled to a remaining one of the seven one-dimensional multipliers 72 and to a remaining one of the seven one-dimensional multipliers 74. Each of the seven one-dimensional multipliers 72 is coupled to one of the two external pins 60, and to an output of an analog multiplexer 76. Each of the seven one-dimensional multipliers 74 is coupled to the other of the two external pins 60, and to an output of an analog multiplexer 80. The one-dimensional multipliers 72 and 74 are utilized to generate and update weight signals and threshold signals in accordance with equation (6).

The weight signals produced by the one-dimensional multipliers 72 are applied to two seven-dimensional multipliers 82 and 84. The weight signals produced by the one-dimensional multipliers 74 are applied to two seven-dimensional multipliers 86 and 88. Each of the six external pins 52 is coupled to the seven-dimensional multipliers 82 and 86. Each of the six external pins 56 is coupled to the seven-dimensional multipliers 84 and 88. The internal voltage line is coupled to all of the seven-dimensional multipliers 82, 84, 86, and 88.

Each of the seven-dimensional multipliers 82, 84, 86, and 88 is coupled to a corresponding one of sigmoidal function generators 92, 94, 96, and 98, respectively. As a result, signals produced at the output of the sigmoidal function generators 92 and 94 are in accordance with equation (2). Further, signals produced at the output of the sigmoidal function generators 96 and 98 are in accordance with equation (1). In a more compact realization, the multiplier function and sigmoidal function are combined into one circuit realization. The outputs of sigmoidal function generators 92 and 94 are applied to external pins 54. The outputs of the sigmoidal function generators 96 and 98 are applied to external pins 62.

The output of the sigmoidal function generator 96 is coupled to an input of the multiplexer 76. The output of the sigmoidal function generator 98 is coupled to an input of the multiplexer 80. The multiplexers 76 and 80 further receive a reference voltage as a second input. The outputs of the multiplexers 76 and 80 are controlled by the layer indication signal received via the external pin 66. The outputs of the multiplexers 76 and 80 provide signal representations of the variable $z_p$ as described by equations (7) and (8).

The two external pins 60 are each coupled to six two-dimensional multipliers 100. Each of the two-dimensional multipliers 100 further receives two weight signals from the one-dimensional multipliers 72 and 74. The outputs of the two-dimensional multipliers are applied to the external pins 64.

The feedforward circuit which results generates 2 outputs from 6 inputs, 2 threshold units and 14 weights. The outputs are applied to the inputs of the next layer, and used to modify the connection weights, $w_{ji}$ and the threshold weights, $\theta_j$, in the learning circuit. These modified weights are used to generate back-propagation error signals for the previous layer and also applied to the feedforward circuit. In the output layer, the desired target signal is supplied through the error terminals, $\bar{e}_i$. Then back-propagated error signals are generated and sent through the error terminals, $\underline{e}_i$. These signals are supplied to the error terminal, $\underline{e}_i$, of the previous hidden layer. If there is no lower layer, then the error signals are not propagated backward any further. These error signals update the connection weights and threshold weights during the learning mode in order to minimize the errors.

In practice, the desired value of the outputs and the value of the weights converge in about 4 to 40 μ sec. For processing, a propagation delay of 0.5 to 5 μ sec is typical for prototypes in 2 μm technology. Faster convergence and processing can be achieved by smaller technologies.

In a preferred embodiment, the above-described circuits have a CMOS implementation in the integrated circuit. Here, a wide-range transconductance amplifier is employed for both synapses and soma. A modified Gilbert multiplier, which is a four-quadrant multiplier, is employed in the synapse circuits. In the small-signal range, the characteristic curve is approximately linear. In the large-signal range, the multiplier is nonlinear and stable. Since the Gilbert multiplier has current as an output, a diode-connected MOS resistor is employed at the output stage of the multiplier to convert current to voltage. This resistor may be sufficient to render the Gilbert multiplier into a synpse and soma function all in one.

Figure 3:
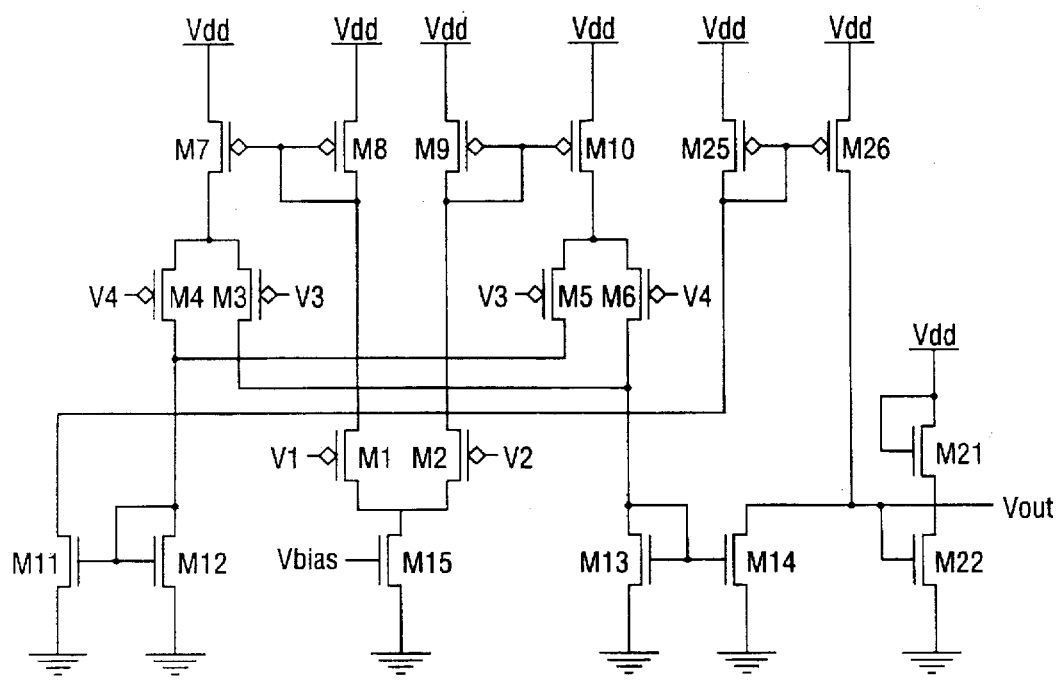
FIG. 3 is a schematic drawing of a modified Gilbert multiplier for use in embodiments of the present invention.

A schematic drawing of an embodiment of a modified Gilbert multiplier for use in the present invention is illustrated in FIG. 3. The modified Gilbert multiplier comprises NMOS transistors M1, M2, M11, M12, M13, M14, M15, M21, and M22, and PMOS transistors M3, M4, M5, M6, M7, M8, M9, M10, M25 and M26 connected as illustrated. Power is supplied along the "Vdd" rail. The modified Gilbert multiplier produces an output voltage along the "Vout" line which approximates a product of the difference between voltages applied at V4 and V3 and the difference between voltages at V2 and V1.

The Gilbert multiplier is modified to perform multi-dimensional multiplication (i.e., a dot-product, vector multiplication). The differential output currents from the multiplier are summed onto current buses, and are converted to a voltage through linear MOS resistors. In this manner, the construction of higher dimensional vector multipliers may be realized.

Figure 4:
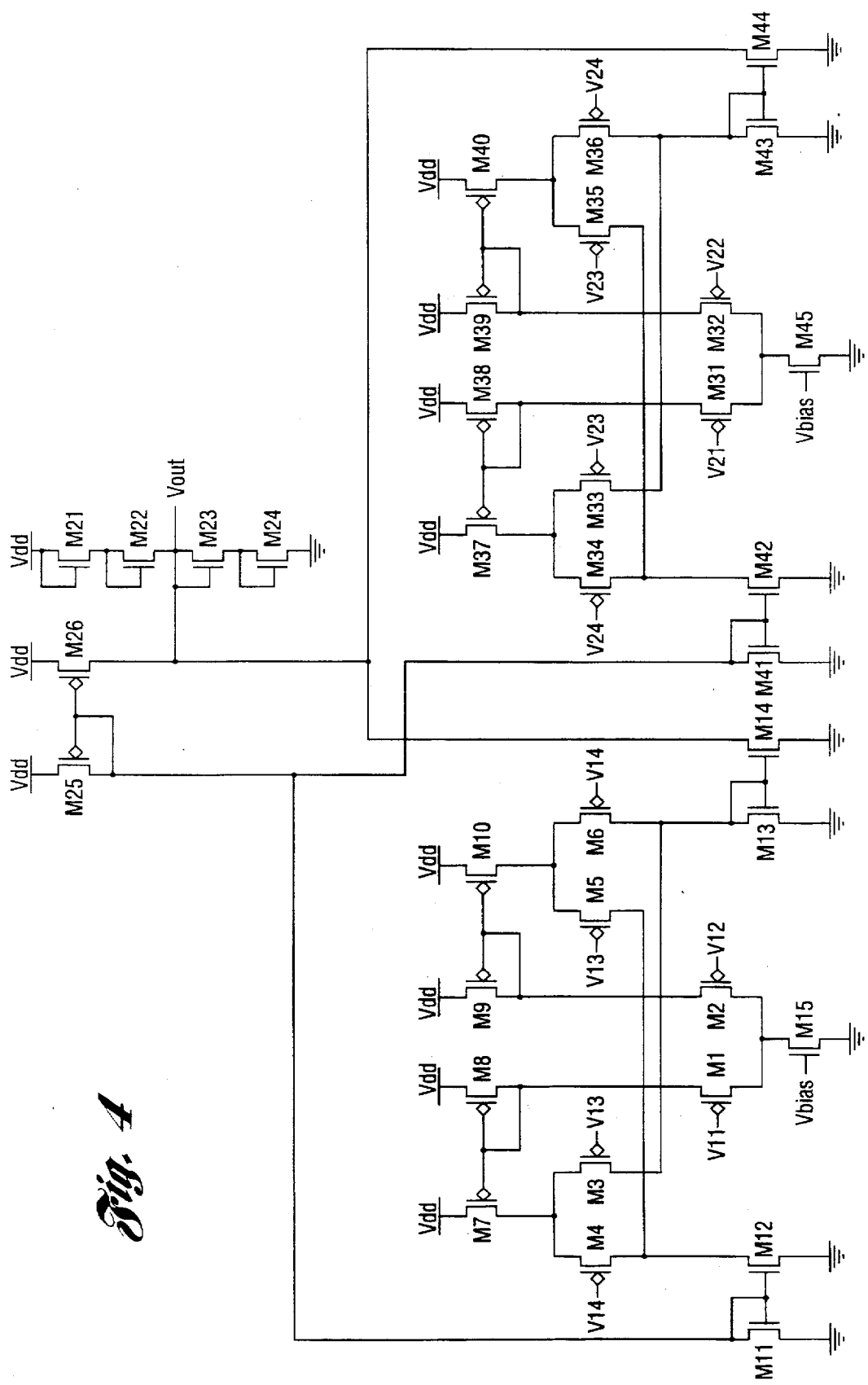
FIG. 4 is a schematic drawing of a two-dimensional multiplier for use in embodiments of the present invention.

FIG. 4 is a schematic drawing of an embodiment of a two-dimensional multiplier in accordance with the above-described modification of the Gilbert multiplier. The two-dimensional multiplier produces an output voltage along "Vout" which approximates the sum of (V14–V13)×(V12–V11) and (V24–V23)×(V22–V21).

In the synapse realization of the neural network, the linearity of the multiplier is not found to be essential to the performance of the neural network. Consequently, the Gilbert multiplier, which is essentially nonlinear, works well in the context of the present invention.

Further in a preferred embodiment, the sigmoidal function generators may be distinctly constructed using wide-range transconductance amplifiers. The transconductance is proportional to the bias current. The output of the transconductance amplifier, which is in the form of a current, can be modeled as a hyperbolic tangent function. Five diode-connected MOS transistors are coupled to the output of the transconductance amplifiers to convert the output into a voltage.

Figure 5:
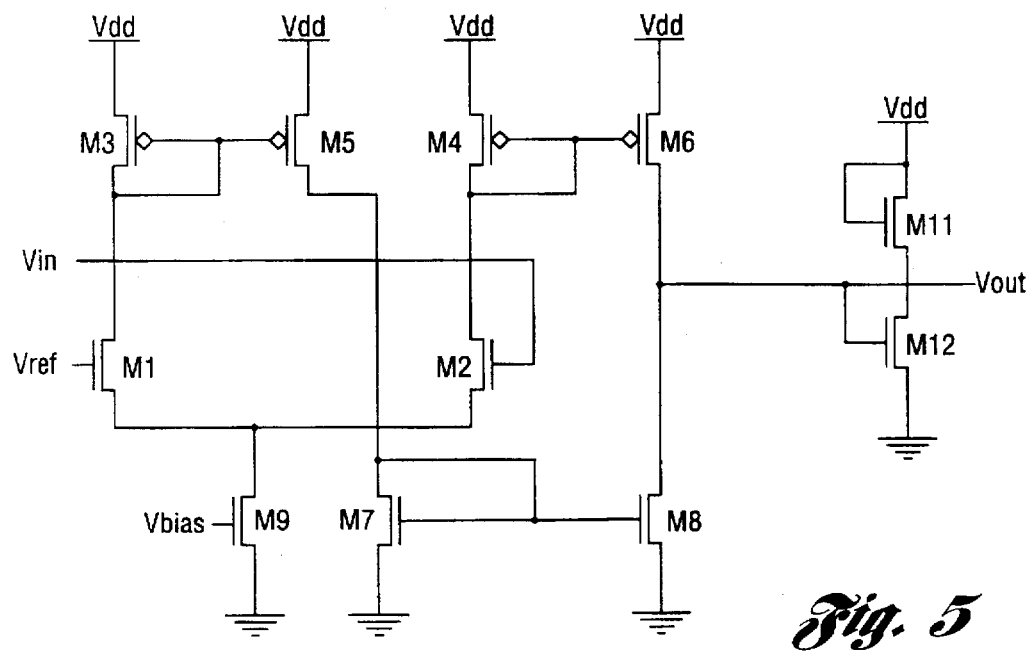
FIG. 5 is a schematic drawing of a soma circuit for use in embodiments of the present invention.

FIG. 5 illustrates one embodiment of a soma circuit for use in embodiments of the present invention. The soma circuit is formed by NMOS transistors M1, M2, M7, M8, M9, M11 and M12, and PMOS transistors M3, M4, M5, and M6. The voltage at "Vout" is a sigmoidal function of the voltage at "Vin" with respect to "Vref".

Figure 6:
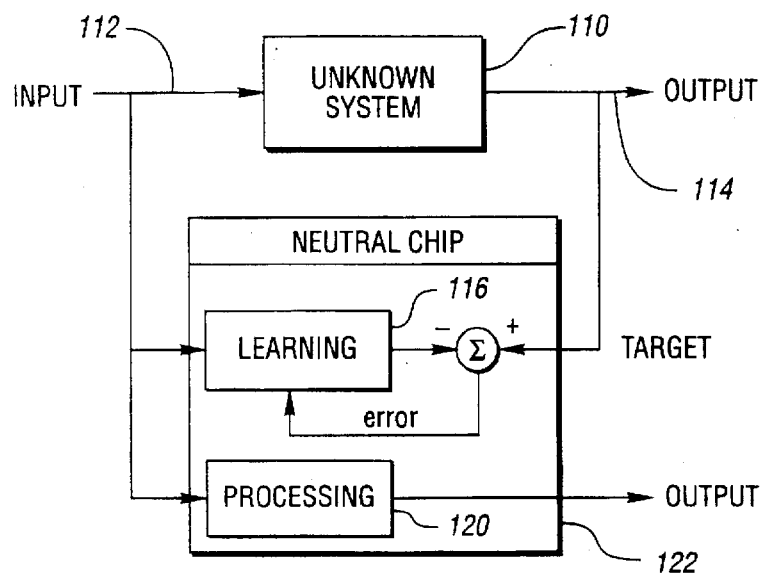
FIG. 6 is a block diagram illustrating a system modeling application of an embodiment of the neural network integrated circuit.

Referring to FIG. 6, there is shown a block diagram illustrating a system modeling application of an embodiment of the neural network integrated circuit. A system 110 of unknown structure has an observable input signal applied along line 112 and an observable output signal produced along line 114. The input signal is applied to both a learning circuit 116 and a processing circuit 120 within an appropriately-sized neural network integrated circuit 122. The output signal is applied to a target terminal of the integrated circuit 116 to provide target values for training the learning circuit 116. As a result, the neural network develops a response at the output of the processing circuit 120 which matches that of the system 110. Consequently, the neural network integrated circuit 122 provides a dynamic model of the system 110.

Figure 7:
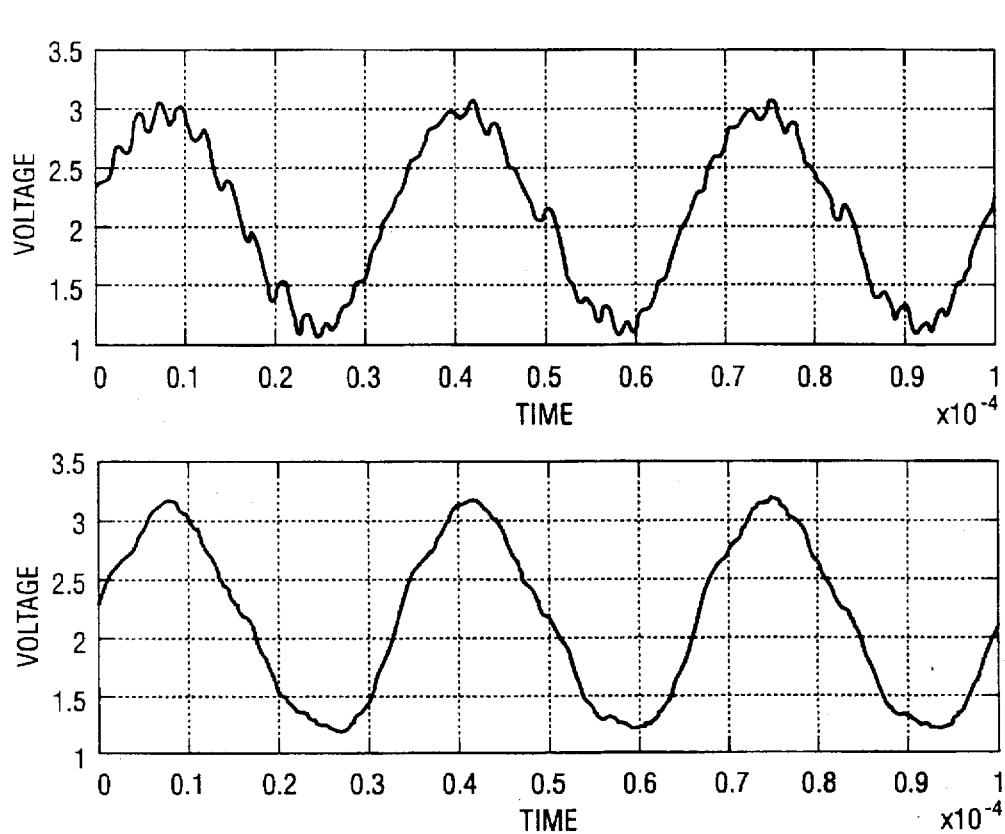
FIG. 7 shows waveforms produced in a demonstration of a system modeling application.

FIG. 7 shows waveforms produced at the output of the system 110 and the output of the processing circuit 120 in a demonstration of the application of FIG. 3. A sine wave is applied as the input signal to the system 110. The system produces a distorted sine waveform 123. The output of the processing circuit 120 provides a similar waveform 124.

Figure 8:
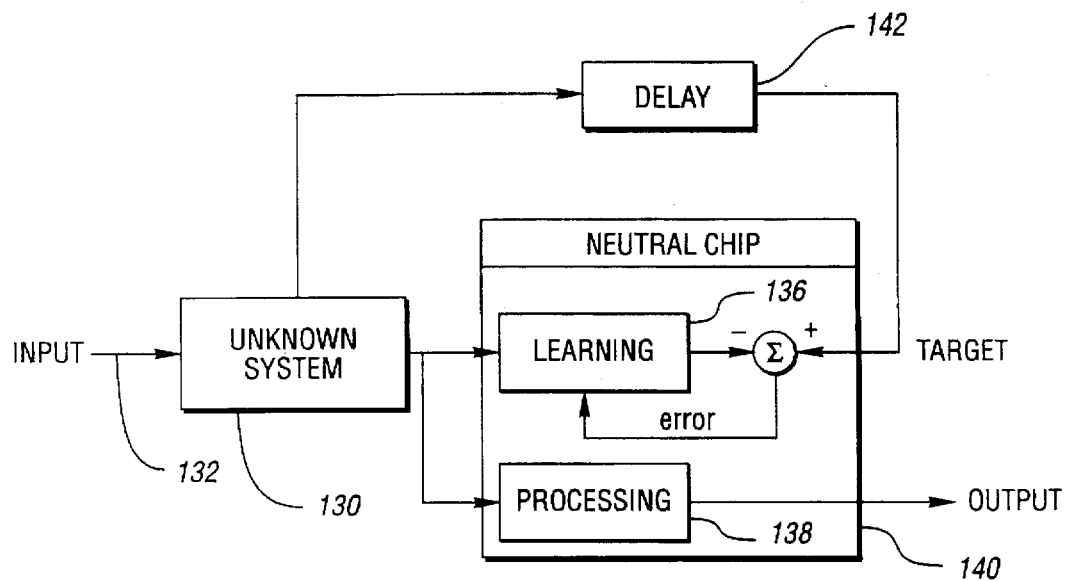
FIG. 8 is a block diagram illustrating an inverse modeling application of an embodiment of the neural network integrated circuit.

Turning now to FIG. 8, there is shown a block diagram illustrating an inverse modeling application of an embodiment of the neural network integrated circuit. A system 130 of unknown structure receives an observable input signal along line 132, and produces an observable output signal along line 134. The output signal is applied to both a learning circuit 136 and a processing circuit 138 within a neural network integrated circuit 140. The input signal is applied to a delay circuit 142 to provide a delayed version thereof equivalent to the delay generated by the cascade of system 130 and the neural chip 140. The delayed input signal is applied to the target terminal of the integrated circuit 140.

In this application, the neural network attempts to recover a delayed version of the input signal to account for delays of the forward path composed of the unknown system and the network, which is assumed to have been altered by the system 130 with additive noise. The learning circuit 136 attempts to minimize the error between the delayed input signal and the processed input signal. As a result, the neural network develops a response at the output of the processing circuit 138 which provides an inverse model of the system 130.

Figure 9:
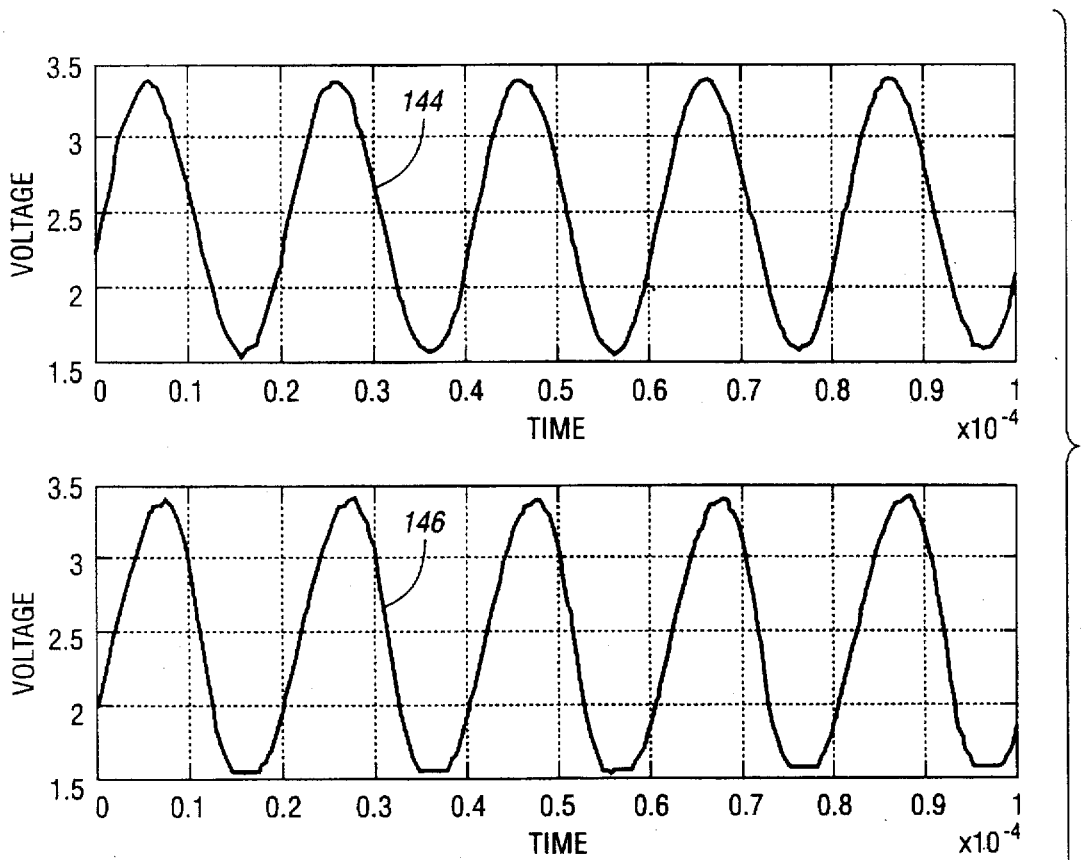
FIG. 9 shows waveforms produced in a demonstration of an inverse modeling application.

FIG. 9 shows waveforms produced at the input of the system 130 and the output of the processing circuit 138 in a demonstration of the application of FIG. 5. For a sine wave waveform 144 as an input signal to the system 130, the output of the processing circuit 138 provides a similar, but may be delayed, waveform 146.

Figure 10:
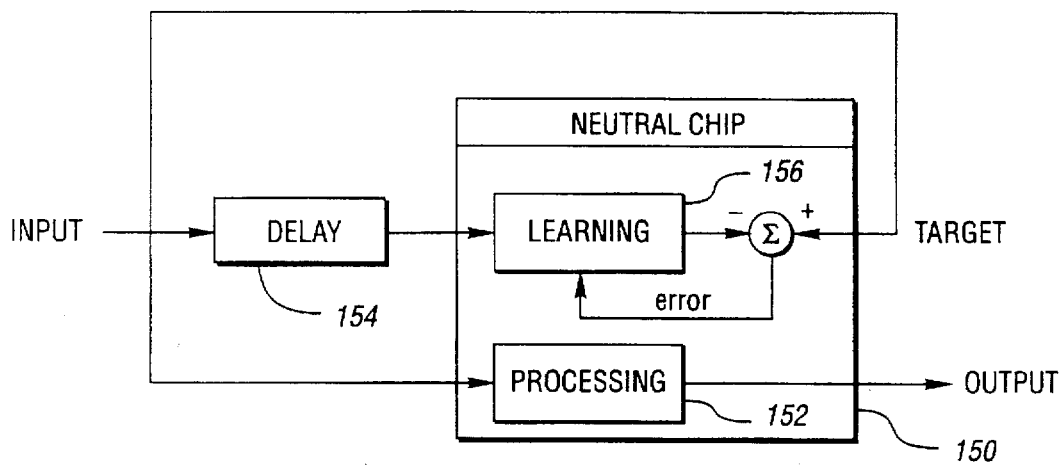
FIG. 10 is a block diagram illustrating a prediction application of an embodiment of the neural network integrated circuit.

Turning now to FIG. 10, there is shown a block diagram illustrating a prediction application of an embodiment of the neural network integrated circuit. An observable signal, whose future value is to be predicted, is applied to a target terminal of a neural network integrated circuit 150. The signal is also applied to a processing circuit 152 within the integrated circuit 150. The signal is delayed by a delay circuit 154, and the delayed signal is applied to an input of a learning circuit 156 within the integrated circuit 154. The neural network works to predict the current input signal in order to drive the error toward zero.

Figure 11:
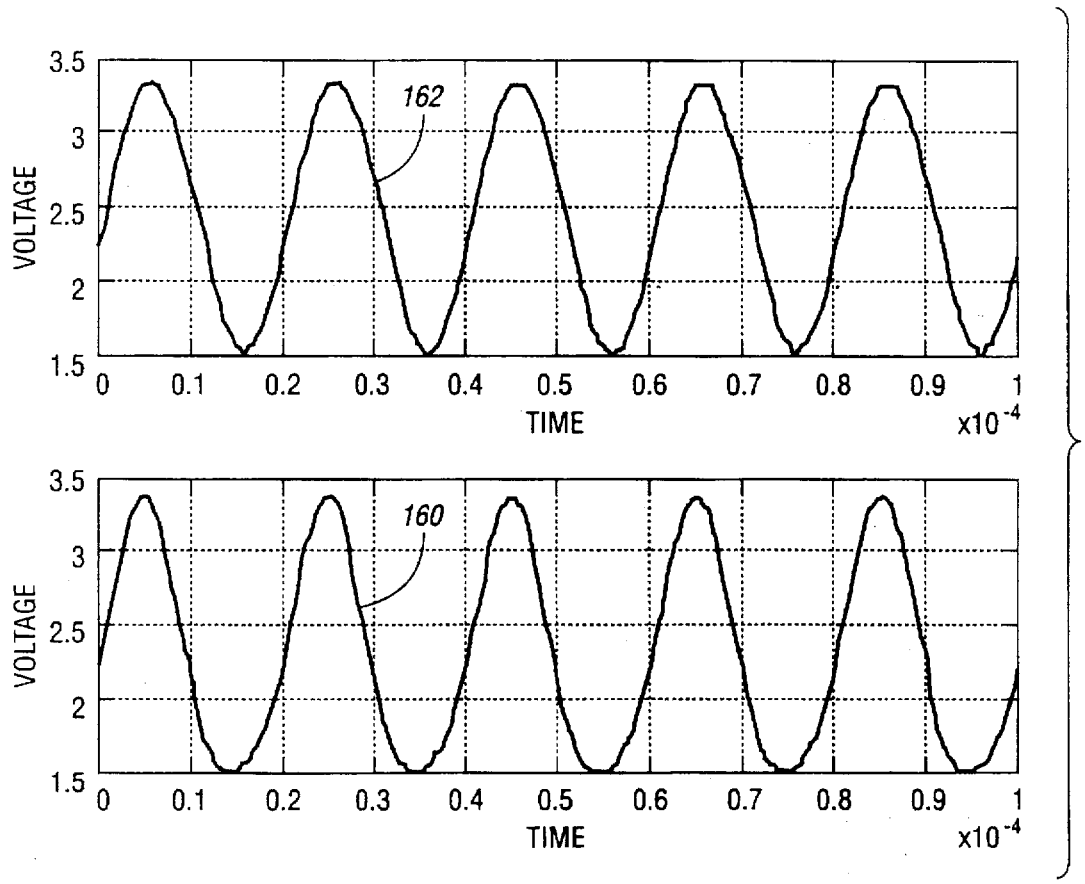
FIG. 11 shows waveforms produced in a demonstration of a prediction application.

FIG. 11 shows waveforms produced at the input and the output of the processing circuit 152 in a demonstration of the application of FIG. 7. As can be seen, the output waveform 160 provides a similar, leading indicator of the input waveform 162.

In all of the above demonstrations, a 2 V peak-to-peak sine wave at 50 kHz is used as the input signal. Only the internal capacitors are used for updating the weights. For the neural network integrated circuit, the typical propagation delay is within 5 microseconds, and the power consumed is approximately 30 mW.

The above-described embodiments of the present invention have many advantages. By including both a learning circuit and a processing circuit in the neural network chip, whereby the learning circuit indirectly holds the learned weights for the processing circuit, an additional interface for weight refreshing is not required. As a result, any external pins for a weight interface can be used for another purpose.

By implementing a modified, continuous-time gradient descent learning method in hardware, the neural network chip performs a fast and efficient learning of training patterns applied thereto. In practice, computation and convergence is achieved on the order of a few milliseconds.

Further, the architecture of the neural network chip is easily scaled to large networks and is viable for large scale adaptive signal processing by utilizing a modular design. In particular, a plurality of like neural network chips can be connected both vertically and horizontally in order to realize a large scale neural network. The same type of chip can be used in both the hidden layer or the output layer, with the layer being determined by a signal applied to an external pin on the chip. Thus, it is easy to configure a large-scale network by simply connecting together several like chips.

While the best mode for carrying out the invention has been described in detail, those familiar with the art to which this invention relates will recognize various alternative designs and embodiments for practicing the invention as defined by the following claims.

What is claimed is:

1. A neural network integrated circuit comprising:
    a learning circuit which receives a first learning vector signal and a second learning vector signal and generates a plurality of weight signals based thereupon; and
    a first feedforward network which receives the weight signals and an input vector signal and forms an output vector signal based thereupon;
    wherein the learning circuit includes a second feedforward network which forms a learning output vector signal based upon the first learning vector signal and the weight signals, and wherein the learning circuit and the first feedforward network have an analog circuit implementation.

2. (Amended) The neural network integrated circuit of claim 1 wherein the first feedforward network forms the output vector signal in accordance with the following equation:

$$o_j = S\left(\sum_i g(w_{ji}, P_i)\right)$$

where g (.,.) denotes a general synapse function, S(.) is a differentiable and monotonic function, $P_i$ is the input vector signal, and $w_{ji}$ denotes the weight signals.

3. The neural network integrated circuit of claim 1 wherein the second feedforward network forms the learning output vector signal in accordance with the following equation:

$$y_j = S\left(\sum_i g(w_{ji}, x_i)\right)$$

where g (.,.) denotes a general synapse function, S(.) is a differentiable and monotonic function, $x_i$ denotes the learning vector signal, and $w_{ji}$ denotes the weight signals.

4. The neural network integrated circuit of claim 1 wherein the second feedforward network is substantially identical to the first feedforward network.

5. The neural network integrated circuit of claim 1 wherein the learning circuit includes a weight updating circuit which updates the weight signals based upon the first learning vector signal and the second learning vector signal.

6. The neural network integrated circuit of claim 5 wherein the weight updating circuit updates the weight signals based upon the learning output vector signal in response to receiving a predetermined layer signal.

7. The neural network integrated circuit of claim 6 wherein the weight updating circuit updates the weight signals based upon the following equation:

$$\dot{w}_{ji} = \eta' \sum_p \delta_{p_j} \cdot x_{p_i} - \alpha_{ji} w_{ji}$$

where $w_{ji}$ denotes the weight signals, $\eta'$ is a learning constant, p is an index identifying different training patterns, and $\delta_{p_j}$ is a layer-dependent updating quantity.

8. The neural network integrated circuit of claim 7 wherein the updating quantity $\delta_{p_j}$ for a hidden layer is given by:

$$\delta_{p_j} = \sum_k \delta_{p_k} w_{kj}.$$

and wherein the updating quantity for an output layer is given by:

$$\delta_{p_j} = t_{p_j} - y_{p_j}$$

where $t_{p_j}$ denotes the target output for the pth training pattern.

9. The neural network integrated circuit of claim 6 wherein the weight signals are updated based upon a difference between the second learning vector signal and the learning output vector signal in response to receiving the predetermined layer signal.

10. The neural network integrated circuit of claim 5 wherein the weight updating circuit updates the weight signals in accordance with a back-propagation updating rule.

11. A neural network integrated circuit comprising:

a first feedforward network which receives an input vector signal and a plurality of weight signals and forms an output vector signal based thereupon;

a second feedforward network, substantially identical to the first feedforward network, which receives a first learning vector signal and the weight signals and forms a learning output vector based thereupon;

a weight updating circuit which generates the weight signals, the weight updating circuit updating the weight signals in accordance with a back propagation updating rule, wherein the weight signals are updated based upon the first learning vector signal and a second learning vector signal in response to receiving a first predetermined layer signal, and wherein the weight signals are updated based upon the first learning vector signal, the second learning vector signal, and the learning output vector signal in response to receiving a second predetermined layer signal; and a back propagation feedback network which receives the second learning vector signal and the weight signals and generates a back propagated error vector signal based thereupon.

* * * * *